(12) United States Patent
Chanez et al.

(10) Patent No.: US 11,772,779 B2
(45) Date of Patent: Oct. 3, 2023

(54) PROPULSION UNIT WITH IMPROVED BOUNDARY LAYER INGESTION

(71) Applicant: SAFRAN AIRCRAFT ENGINES, Paris (FR)

(72) Inventors: Philippe Gérard Chanez, Moissy-Cramayel (FR); Jean-Michel Daniel Paul Boiteux, Moissy-Cramayel (FR); Nicolas Jérôme Jean Tantot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 42 days.

(21) Appl. No.: 17/627,191

(22) PCT Filed: Jul. 6, 2020

(86) PCT No.: PCT/FR2020/051189
§ 371 (c)(1),
(2) Date: Jan. 14, 2022

(87) PCT Pub. No.: WO2021/009433
PCT Pub. Date: Jan. 21, 2021

(65) Prior Publication Data
US 2022/0274687 A1 Sep. 1, 2022

(30) Foreign Application Priority Data

Jul. 17, 2019 (FR) ........................................ 1908080

(51) Int. Cl.
*B64C 21/06* (2023.01)
*B64D 27/20* (2006.01)
*B64D 29/04* (2006.01)
*B64C 1/16* (2006.01)
*B64D 33/02* (2006.01)

(52) U.S. Cl.
CPC ................ *B64C 21/06* (2013.01); *B64C 1/16* (2013.01); *B64D 27/20* (2013.01); *B64D 29/04* (2013.01);
(Continued)

(58) Field of Classification Search
CPC ........... B64C 21/06; B64C 21/01; B64C 1/16; B64D 27/20; B64D 29/04; B64D 2033/0286; B64D 2033/0206
See application file for complete search history.

(56) References Cited

U.S. PATENT DOCUMENTS 3,465,990 A   9/1969 Holland, Jr.
4,456,204 A * 6/1984 Hapke ................... B64D 33/02
                                                        244/58

(Continued)

FOREIGN PATENT DOCUMENTS

EP   2886453 A1 *  6/2015 ............. B64C 21/06
FR   1499853 A    11/1967
(Continued)

OTHER PUBLICATIONS

French Search Report issued in French Application FR1908080 dated Mar. 12, 2020 (2 pages).
(Continued)

*Primary Examiner* — Magdalena Topolski
*Assistant Examiner* — Anna L. Gordon
(74) *Attorney, Agent, or Firm* — Bookoff McAndrews, PLLC

(57) ABSTRACT

Propulsion assembly for an aircraft, comprising a fuselage extending along a longitudinal axis and enclosing an inner enclosure, at least one ducted engine fixed to the fuselage and comprising an air inlet section, the air inlet section being disposed at least partly in the inner enclosure, at least one plenum chamber disposed in the inner enclosure upstream of
(Continued)

the air inlet section and in fluid communication with said air inlet section, at least one air intake formed on an outer wall of the fuselage, the inlet of the air intake being partly delimited by said outer wall of the fuselage, the air intake being configured to ingest external air and deflect it towards the plenum chamber.

11 Claims, 6 Drawing Sheets

(52) U.S. Cl.
CPC ............... *B64D 2033/0206* (2013.01); *B64D 2033/0286* (2013.01)

(56) References Cited

U.S. PATENT DOCUMENTS

| | | | | |
|---|---|---|---|---|
| 5,174,524 | A | * | 12/1992 | Amneus, III ........... F02K 9/974 137/15.1 |
| 9,046,035 | B2 | * | 6/2015 | Megerian .................. F02K 7/10 |
| 2015/0122952 | A1 | | 5/2015 | Florea et al. |
| 2019/0061961 | A1 | * | 2/2019 | Pastouchenko ........ B64D 27/24 |
| 2020/0189724 | A1 | * | 6/2020 | Terwilliger ............. B64C 21/06 |
| 2020/0325851 | A1 | * | 10/2020 | Higbie ..................... F01D 25/04 |
| 2020/0385136 | A1 | * | 12/2020 | Solstin ...................... F02C 7/05 |

FOREIGN PATENT DOCUMENTS

| | | |
|---|---|---|
| FR | 2919267 A1 | 1/2009 |
| WO | 2015198296 A2 | 12/2015 |

OTHER PUBLICATIONS

International Search Report issued in International Application PCT/FR2020/051189 dated Oct. 7, 2020 (5 pages).

\* cited by examiner

[Fig. 1]
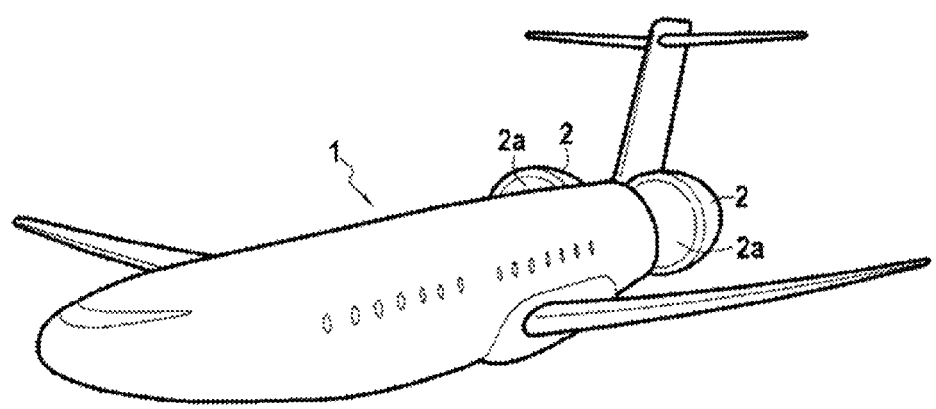

[Fig. 2A]
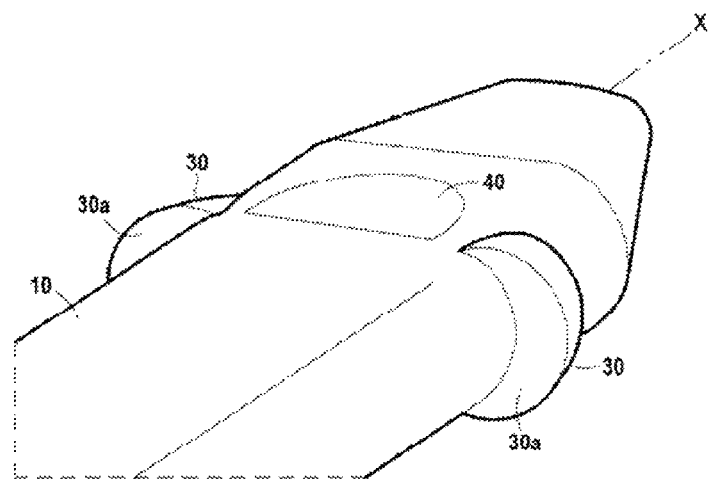
[Fig. 2B]
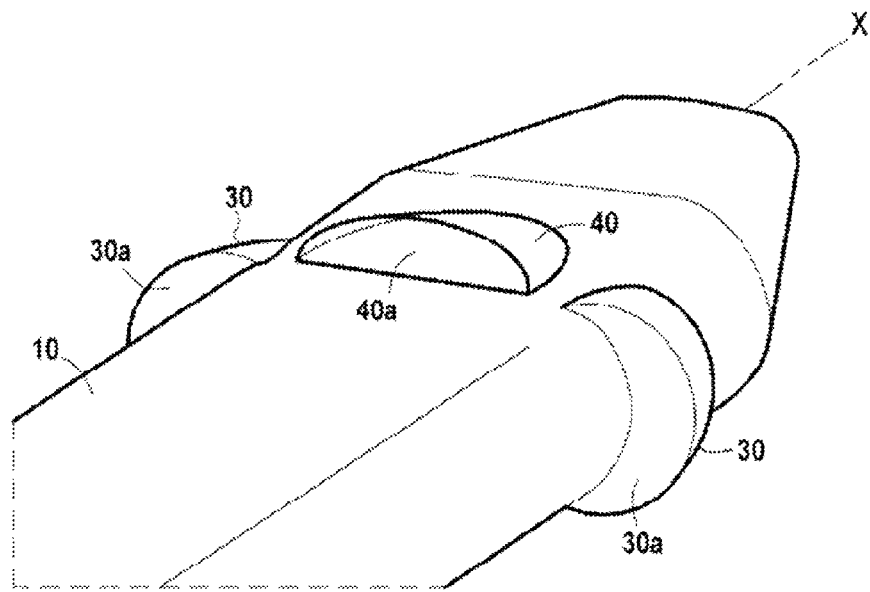

[Fig. 3]
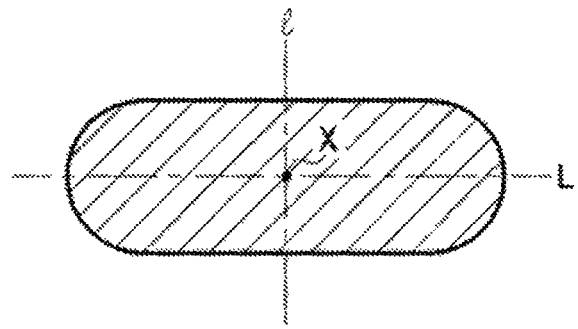
[Fig. 4]
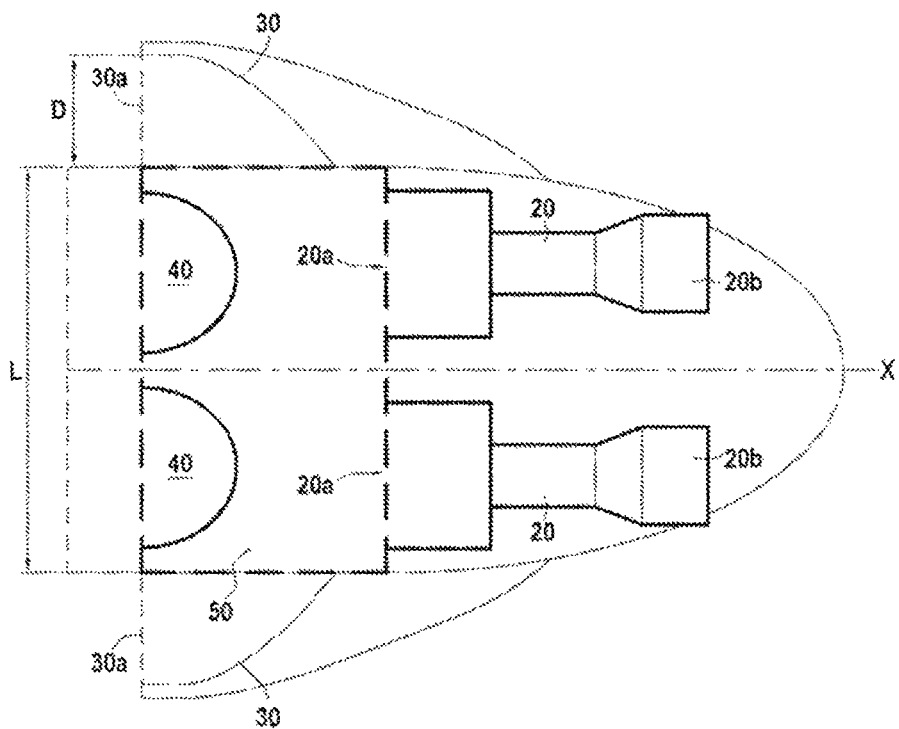

[Fig. 5]
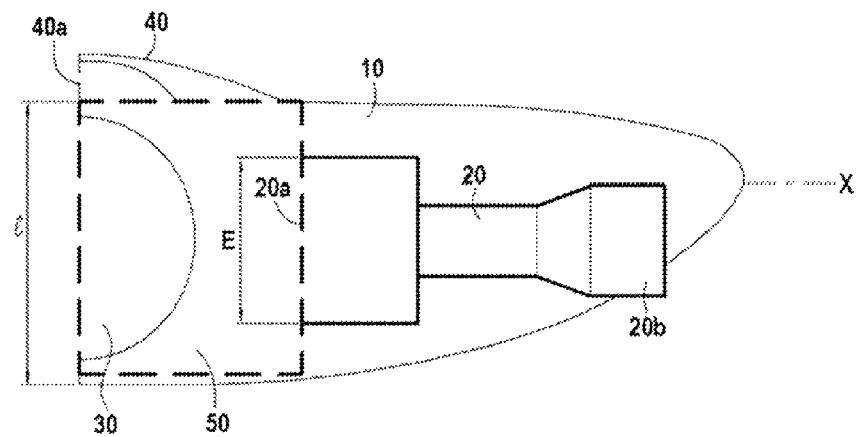
[Fig. 6]
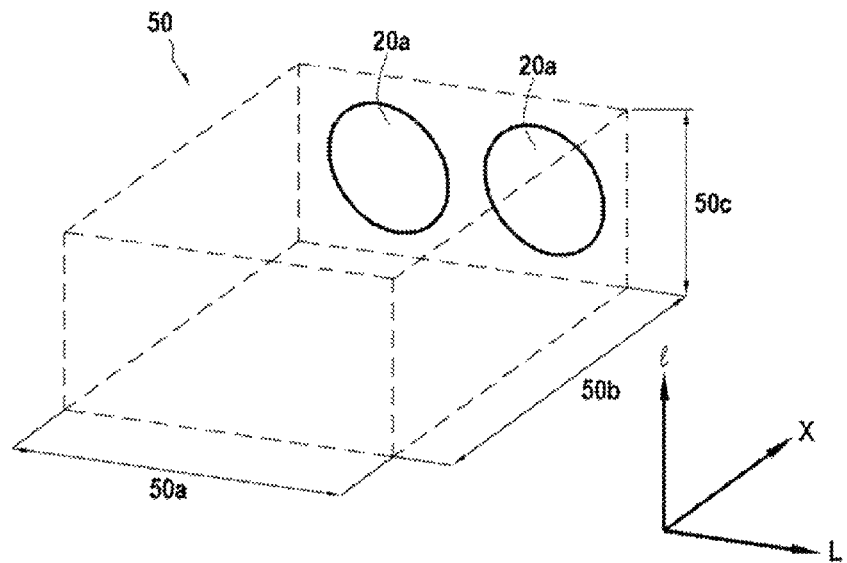

[Fig. 7]
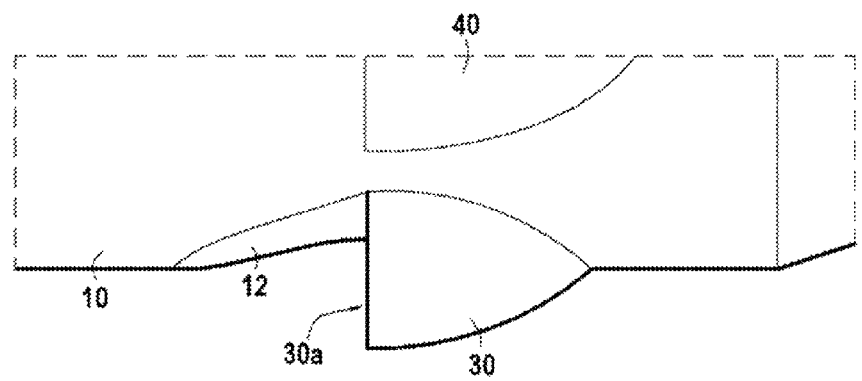
[Fig. 8]
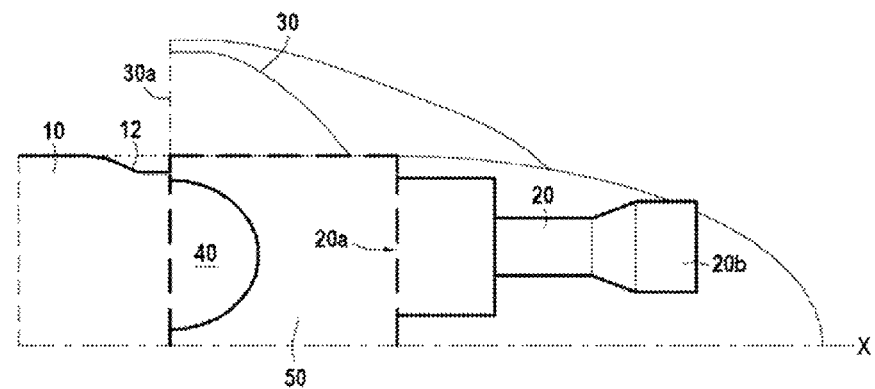

[Fig. 9]
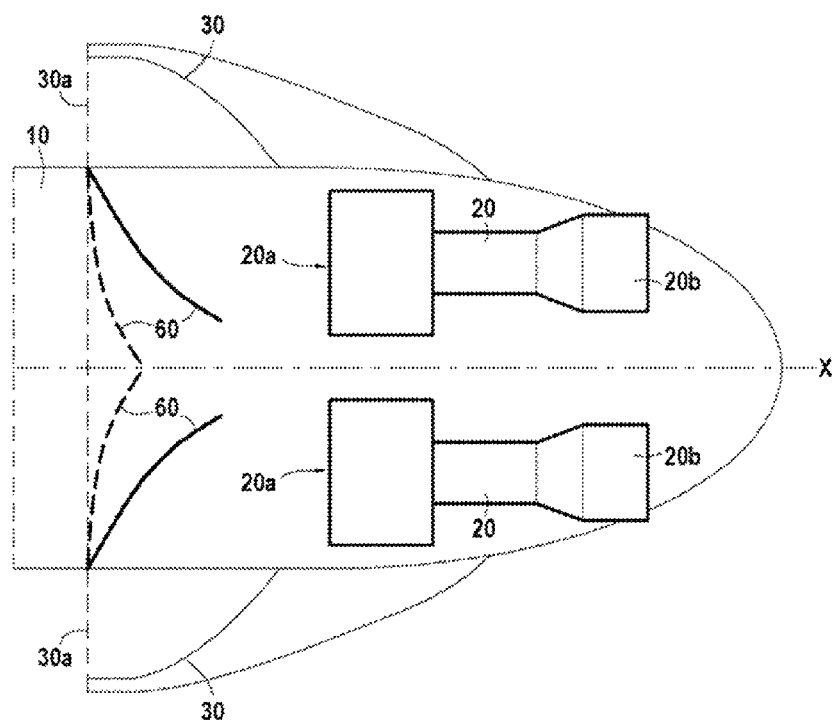

PROPULSION UNIT WITH IMPROVED BOUNDARY LAYER INGESTION

CROSS-REFERENCE TO RELATED APPLICATIONS

This patent application is the U.S. National Stage entry under 35 U.S.C. § 371 of International Patent Application No. PCT/FR2020/051189, filed on Jul. 6, 2020, which claims the benefit of priority to French Patent Application No. 1908080, filed on Jul. 17, 2019, the entirety of the '080 application is incorporated by reference herein.

TECHNICAL FIELD

This present disclosure relates to the field of boundary layer ingestion aircraft engines and more particularly a propulsion assembly for aircrafts comprising such engines, and an aircraft comprising such a propulsion assembly.

PRIOR ART

With a view to improving the efficiency of aircraft engines, in particular those propelling long-range airplanes such as business or long-haul type airplanes, a known technique is based on the principle of Boundary Layer Ingestion (BLI) which allows, by arranging the engine such that it can absorb the boundary layer which develops on the airplane fuselage, reducing drag while increasing the propulsive efficiency of the engine.

More specifically, the engine is disposed such that its air intake section is flush with the surface of the fuselage, or partly integrated into the fuselage of the aircraft, such that the boundary layer developing along the wall of said fuselage is ingested directly into the engine. Thus, the boundary layer ingestion technique has at least two advantages.

On the one hand, the fact that the absorbed boundary layer no longer rubs on the fuselage part which is downstream of the engine air inlet, since it is absorbed by this air inlet and transformed into propulsive momentum, allows limiting the drag of the aircraft.

On the other hand, the fact that the stream entering the engine has an average Mach substantially lower than the flight Mach of the aircraft, due to the presence of the boundary layer, is characterized by a lower average total pressure and therefore an average speed of the air flow lower than the flight speed. Consequently, the engine thrust can be obtained with a nozzle ejection speed lower than in a conventional installation, the term "conventional" referring in particular to the configurations for which the engine is disposed under a wing of the aircraft or installed laterally to the fuselage at a distance greater than once the fan diameter. Indeed, the thrust is proportional to the difference between the ejection speed and the speed at the engine inlet. Thus, by decreasing the air inlet speed, it is possible to obtain the same thrust for a lower ejection speed. The gross energy force requested from the propulsion system to create this speed difference is therefore lower, which allows reducing the required fuel flow rate.

However, this boundary layer ingestion technique has drawbacks. Particularly, although the average Mach at the engine inlet is lower than for a conventional installation, in particular with a nacelle and a pylon disposed under a wing or behind the fuselage, this average hides a strong spatial distortion of the total pressure on the air inlet section. This distortion is due to the fact that the speed is lower at the boundary layer, close to the fuselage wall, than on the remainder of the air inlet section. This strong inhomogeneity of the stream entering the engine has a significant negative impact in terms of aerodynamic performances and aeromechanical behavior. Particularly, it has a negative impact on the polytropic efficiency of the fan and its aeroelastic behavior.

There is therefore a need for a propulsion assembly for at least partly overcoming the drawbacks mentioned above.

DISCLOSURE OF THE INVENTION

The present disclosure relates to a propulsion assembly for an aircraft, comprising:
- a fuselage extending along a longitudinal axis and enclosing an inner enclosure,
- at least one ducted engine fixed to the fuselage and comprising an air inlet section, the air inlet section being disposed at least partly in the inner enclosure,
- at least one plenum chamber disposed in the inner enclosure upstream of the air inlet section and in fluid communication with said air inlet section,
- at least one air intake formed on an outer wall of the fuselage, the inlet of the air intake being partly delimited by said outer wall of the fuselage, the air intake being configured to ingest external air and deflect it towards the plenum chamber.

In the present disclosure, the terms "upstream" and "downstream" refer to the direction of flow of the external air coming from the region external to the propulsion assembly, entering the inner enclosure and flowing up to the air inlet section of the engine, through the plenum chamber.

The longitudinal axis of the fuselage corresponds to the longitudinal axis of an aircraft, extending between the front and the back of the latter. The longitudinal axis may be parallel to the axis of rotation of the engine(s). By "ducted engine" is meant an engine surrounded by a wall or nacelle of generally annular shape. The engine is preferably a ducted bypass engine, comprising, from upstream to downstream, a fan, a low-pressure compressor, a high-pressure compressor, a combustion chamber, a high-pressure turbine and a low-pressure turbine, the whole being wrapped in a fairing. Alternatively, the engine can be a distributed propulsion engine comprising a ducted fan driven either directly by a gas generator comprising, from upstream to downstream, a compressor, a combustion chamber and a turbine or through an electric motor. The air inlet section of the engine corresponds to the plane in which the engine fan is disposed. Furthermore, it is understood that the inlet of the air intake is delimited on the one hand by a wall of said air intake separate from the wall of the fuselage, and on the other hand by the fuselage wall itself. In other words, the air intake comprises a wall attached to the fuselage and continuously connected to the wall of the fuselage. The wall of the air intake can for example take the form of a half-tube fixed to the wall of the fuselage, so that the wall of the fuselage itself delimits, partly, the inlet section of the air intake. Thus, when the aircraft is in motion, the boundary layer formed along the outer wall of the fuselage is directly ingested by the air intake. The ingestion of this boundary layer thus allows improving the propulsive efficiency of the engine.

In addition, the plenum chamber is a cavity for homogenizing the flow entering the engine in terms of circumferential and azimuthal distribution of the speed vector of the flow, while further reducing the average Mach at the inlet of this engine. More specifically, the use of the plenum chamber upstream of the engine inlet section allows obtaining a low flow speed upstream of the engine while minimizing the distortion of this flow. This allows a joint optimization of the propulsive efficiency, thanks to the ingestion of the boundary layer by the air intake, and of the polytropic efficiency of the fan (by minimizing the distortion), while greatly limiting the aero-mechanical stresses of the fan blades.

In some embodiments, the air inlet section of the engine is disposed entirely in the inner enclosure of the fuselage.

The inlet section is therefore invisible from outside the fuselage. The entire surface occupied by the inlet section is thus in fluid communication with the plenum chamber, which allows further improving the homogenization of the flow and of the pressure at the inlet of the engine.

In some embodiments, in a view perpendicular to the air inlet section of the engine, the surface of the plenum chamber fully includes the surface of the air inlet section.

In other words, in a view perpendicular to the air intake section of the engine, that is to say a view parallel to the longitudinal axis of the fuselage, the projection of the plenum chamber on a plane comprising the air inlet section of the engine surrounds, that is to say entirely encompasses said air inlet section. This allows further improving the homogenization of the flow and of the pressure over the entire surface of the inlet section of the engine, thus improving the polytropic efficiency of the fan.

In some embodiments, the air intake is a fixed air intake, the assembly comprising at least one retractable air intake, configured to be movable between an open position for ingesting the external air via the retractable air intake and directing it towards the plenum chamber and a closed position preventing external air from entering the plenum chamber via the retractable air intake.

By "fixed" is meant that the dimensions of the inlet section of the air intakes remain constant in all the flight, ground or stationary phases. In other words, the wall forming the fixed air intake remains stationary relative to the fuselage during all these phases. Conversely, by "retractable" is meant that the dimensions of the inlet section of the air intakes may vary depending on the flight, ground or stationary phases. Consequently, in the open position, the retractable air intakes allow ingesting a bigger amount of air into the plenum chamber. This increase in the ingested amount of air is useful in particular in static conditions or during take-off phases, when the speed of movement of the assembly is lower or zero and when the air flow rate required to power the engine is significant. These retractable air intakes, or secondary or auxiliary air intakes, are then closed, discreetly, that is to say by switching directly from the open position to the closed position without an intermediate or progressive position, when the take-off phase is over. Preferably, in the closed position, the retractable air intakes are fully integrated into the outer shape of the fuselage wall, that is to say in the continuity of the outer wall of the fuselage, without inducing any relief along the surface of the fuselage. This allows limiting the risk of creating turbulence in the flow external to the fuselage, which can affect the efficiency of the engine.

Furthermore, the areas in which the retractable air intake(s) are in the open position can be characterized by an altitude of less than 15,000 feet and/or flight Mach of less than 0.45.

In some embodiments, an inlet section of the fixed air intake is at least equal to the inlet section of the engine.

When the assembly comprises several fixed air intakes and/or several engines, the sum of the inlet sections of the fixed air intakes must represent at least the sum of the engine inlet sections, in order to allow a correct supply to the plenum chamber.

In some embodiments, an inlet section of the retractable air intake in the open position is comprised between 25 and 50% of the section of the fixed air intake. For some flight phases, one or several retractable air intakes can be added.

These values allow ensuring a sufficient air ingestion flow rate in the plenum chamber in order to allow optimum efficiency of the engine.

In some embodiments, the propulsion assembly comprises at least one air ingestion ramp hollowed out in the outer wall of the fuselage relative to a reference surface of said wall and extending from a portion of said outer wall located upstream of the air intake up to the inlet section of said air intake.

By "hollowed ramp" is meant an inclined slope formed in the wall of the fuselage, that is to say a part hollowed out relative to a reference surface of the fuselage wall, the reference surface being an average surface of the fuselage wall located around the ramp, and not showing any relief. This reference surface corresponds to the overall shell of the fuselage. In other words, the hollowed ramp represents a concave portion of the fuselage wall, in the direction of the inner enclosure. Conversely, the air intakes represent convex portions of the fuselage wall, in a direction opposite to the inner enclosure. The presence of this ramp allows optimizing the maximum cross-section of the air intakes and the slowing down of the flow.

In some embodiments, the propulsion assembly comprises at least one movable deflector disposed in the plenum chamber and configured to switch from a deployed position in which it is configured to direct the external air towards the air inlet section of the engine, and a retracted position in which it is folded against an inner wall of the plenum chamber.

The deflectors can be fixed to a wall of the plenum chamber or to the fuselage by means of a pivot link. Their movement between the deployed and retracted position can be remotely controlled by means of a control unit, also controlling the retractable air intakes. The deployed position of the deflectors allows, when the flow slows down, creating a channel or passageway directing the air towards the engine inlet in a more direct manner. This allows reducing the recirculation and the pressure drops of this flow in the plenum chamber. The areas in which the deflectors are in the deployed position may also be characterized by an altitude of less than 15,000 feet and/or flight Mach of less than 0.45. In the flight phase, therefore for higher air flow speeds, the deflectors are retracted against the inner wall of the plenum chamber so as not to impede the passage of air into the plenum chamber.

In some embodiments, the propulsion assembly comprises two fixed air intakes formed on the outer wall of the fuselage, at two opposite ends of said fuselage, along a radial direction of said fuselage.

By "radial direction" is meant a direction perpendicular to the longitudinal axis of the fuselage. These two fixed air intakes allow ingesting a sufficient amount of air into the plenum chamber for optimum operation of the engine. The presence of two fixed air intakes is particularly suitable in the presence of two engines.

In some embodiments, at least some inner walls of the plenum chamber comprise an acoustically absorbent material.

The acoustic material can in particular take the form of a honeycomb structure. Particularly, the cells of the honeycomb can be interposed between a perforated skin oriented towards the interior of the plenum chamber and a solid skin, the perforated skin allowing the sound waves to penetrate into the cells in which they will be attenuated. Advantageously, two stages of acoustic cells separated by an acoustically porous layer ("septum") can be provided, the two layers having different thicknesses, thus making it possible to attenuate different wave frequencies. The presence of the acoustically absorbent material further allows improving the dissipation of the sound energy emitted by the fans.

In some embodiments, the fuselage has a substantially elliptical section comprising a major axis and a minor axis, the ratio between the major axis and the minor axis being comprised between 1 and 2.5.

By "substantially elliptical" is meant that the fuselage has a section of elongated shape, for example an oblong or ovoid shape. The major axis and the minor axis each extend in a direction perpendicular to the longitudinal axis of the fuselage. The use of a fuselage of this type is particularly suitable for arranging two or more engines side by side in the width direction, that is to say in a direction perpendicular to the longitudinal axis of the fuselage.

In some embodiments, the plenum chamber has a parallelepiped shape.

This shape has the advantage of being easy to implement in terms of aircraft construction and is particularly adapted to fuselages with an elongated section.

In some embodiments, the parallelepiped shape of the plenum chamber comprises a width extending along the major axis, a length extending along the longitudinal axis and a height extending along the minor axis.

In some embodiments, the width of the plenum chamber is comprised between 2.1E and 2.8E, where E is the diameter of the inlet section of the engine. The diameter E of the inlet section of the engine can be comprised between 1.5 m and 2.5 m. In some embodiments, the length of the plenum chamber is comprised between 1.1E and 2.5E. In some embodiments, the height of the plenum chamber is comprised between 1.3E and 2.0E.

These ratio values between the dimensions of the plenum chamber and the diameter of the air inlet section of the engine allow limiting the recirculation phenomena in the chamber, while optimizing the plenum effect of the flow that is to say the slowing down of the flow, the minimization of the distortion and the homogenization of the flow at the inlet of the engine. This allows further improving the polytropic efficiency of the fan, while greatly limiting the aero-mechanical stresses on the fan blades.

In some embodiments, at the inlet of the fixed air intake, a maximum spacing between the wall of the fuselage and a wall of the fixed air intake delimiting the inlet of said fixed air intake is comprised between 0.5E and 0.8E.

The inlet of the air intake is comprised in a plane and is delimited by the wall of the air intake forming, in this plane, a first curved line and by the wall of the fuselage forming a second curved line with a radius of curvature different from the first curve. Thus, in this plane, a spacing between the wall of the fuselage and the wall of the fixed air intake is a distance between a point of the first curved line and a point of the second curved line, for a given radius of the first curved line. This ratio between the value of this spacing and the diameter of the air inlet section of the engine allows optimizing the air flow rate entering the plenum chamber.

In some embodiments, the assembly comprises two engines disposed side by side along the major axis, the plenum chamber configured to power the two engines.

In other words, the plenum chamber encompasses the inlet sections of both engines. This configuration allows improving the polytropic efficiency of the two fans together.

The present disclosure also relates to an aircraft comprising the propulsion assembly according to any one of the preceding embodiments.

The aircraft is preferably of the fast type, characterized by flight Mach in cruise phase greater than 0.6 and being able to cover a size range making it possible to transport passengers from the "business jet" type to the long-haul airplane. The aircraft can also be of the "flying wing" type.

BRIEF DESCRIPTION OF THE DRAWINGS

The invention and its advantages will be better understood upon reading the detailed description given below of various embodiments of the invention given by way of non-limiting examples. This description refers to the pages of appended figures, on which:

FIG. 1 represents a perspective view of an aircraft, according to the prior art, using the principle of boundary layer ingestion;

FIG. 2A represents a perspective view of a propulsion assembly according to one embodiment of the present disclosure comprising a retractable air intake in the closed position, and FIG. 2B represents the propulsion assembly of FIG. 2A in which the retractable air intake is in the open position;

FIG. 3 represents a view along a cutting plane perpendicular to the longitudinal axis of the propulsion assembly of FIGS. 2A and 2B;

FIG. 4 schematically represents a top view, in transparency, of a propulsion assembly according to one embodiment of the present disclosure comprising two retractable air intakes;

FIG. 5 represents a side view of the propulsion assembly of FIG. 4;

FIG. 6 represents a perspective view of the plenum chamber alone of the propulsion assembly of FIGS. 4 and 5;

FIG. 7 represents a top and partial view of a modified example of the propulsion assembly of FIG. 4;

FIG. 8 represents a top and partial view of a modified example of the propulsion assembly of FIG. 4;

FIG. 9 represents a top view of another modified example of the propulsion assembly of FIG. 4.

DESCRIPTION OF THE EMBODIMENTS

FIG. 1 shows a perspective view of an aircraft according to the prior art, using the principle of boundary layer ingestion. The aircraft comprises a fuselage 1 and two engines 2 fixed to the fuselage 1 at the back of the aircraft. The engines 2 are disposed such that their air inlet section 2a is party disposed in the inner enclosure enclosed by the fuselage 1. In this way, only part of the engines 2 is visible from outside the aircraft, the other part being concealed inside the latter. Thus, the boundary layer being formed on the outer wall of the fuselage 1 during the movement of the aircraft in flight is directly ingested by the engines 2.

The remainder of the description describes a propulsion assembly according to one embodiment of the present disclosure, with reference to FIGS. 2A to 5. The embodiment described in the remainder of the description presents a configuration in which the fuselage has a substantially elliptical or oblong shape and comprises two engines disposed side by side. However, the invention is not limited to this configuration. The fuselage can have a cylindrical shape or other shapes. In addition, the number of engines can be more than two.

FIG. 2A schematically shows a perspective view of a propulsion assembly according to the present disclosure. The propulsion assembly comprises a fuselage 10 enclosing an inner enclosure, not visible in FIG. 2A The fuselage 10 extends along a longitudinal axis X. In a sectional view perpendicular to the longitudinal axis X (FIG. 3), the fuselage 10 has a major axis L extending along a direction perpendicular to the longitudinal axis X and a minor axis I extending along a direction perpendicular to the longitudinal axis X and to the major axis L. The ratio between the major axis L and the minor axis I may be comprised between 1 and 2.5.

In the remainder of the description, the terms "above", "lateral", "side" and their derivatives are considered along the major axis and the minor axis of the ellipse formed by the fuselage. More specifically, a top view corresponds to a view along a direction parallel to the minor axis I, that is to say a view perpendicular to the plane formed by the axes X and L and a side view corresponds to a view along a direction parallel to the major axis L, that is to say a perpendicular view formed by the axes X and I. In other words, when the propulsion assembly is disposed on an aircraft, the sides of the fuselage 10 correspond to the sides on which the wings of the aircraft are disposed and the top of the fuselage 10 corresponds to the face on which a tail fin can be disposed.

The two engines 20 are disposed side by side along the major axis L. In this embodiment, the engines 20 are disposed entirely within the inner enclosure of the fuselage 10 and are not visible in FIG. 2A Particularly, the air inlet section 20a of the engines 20 is disposed entirely in the inner enclosure and is therefore entirely surrounded by the wall of the fuselage 10. Of course, the ejection nozzle 20b of the engines 20 is disposed outside the inner enclosure. To do so, an opening (not represented) allowing the passage of the engines 20 can be provided at the rear end of the fuselage 10 when the propulsion assembly is mounted in an aircraft. In this way, the engines 20 are fixed on the fuselage 10 such that their air inlet section 20a is disposed in the inner enclosure and such that their air ejection nozzle 20b is disposed outside the fuselage 10, thus allowing the ejection of the gases.

The propulsion assembly comprises two fixed air intakes 30 disposed on either side of the fuselage 10 along the major axis L, in other words on the sides of the fuselage 10. The air intakes 30, or scoops, are formed as discontinuities in the outer wall of the fuselage 10, or vents are formed on said wall. Particularly, an upstream end of the air intakes 30 has an arc-shaped wall detached from the wall of the fuselage 10, and substantially following the shape of the outer wall of the fuselage 10 in this region of the fuselage 10. However, the radius of curvature of the wall of the air intakes 30 is smaller than the radius of curvature of the wall of the fuselage 10 in this same region. Thus, the wall of the air intakes 30 and the wall of the fuselage 10 at this upstream end form together an inlet section 30a having the shape of a crescent. The downstream end of the air intakes 30 is continuously connected to the wall of the fuselage 10.

Preferably, the sum of the inlet sections 30a of the fixed air intakes 30 is at least equal to the inlet section of the engine(s). For example, the sum of the inlet sections 30a of the air intakes 30 can be equal to: number_of_engines×CD× $\pi((E/2)^2)$ where E is the diameter of the inlet section of the engine(s) and CD is a coefficient comprised between 1.1 and 1.3. Furthermore, a maximum spacing D between the air intake 30 and the fuselage 10 is comprised between 0.5E and 0.8E, where E is the diameter of the inlet section 20a of the engines 20. A spacing between the air intake 30 and the fuselage 10 is considered as the distance, at the inlet section 30a, between the wall of the air intake 30 and the wall of the fuselage 10, for a given radius of the air intake air 30.

The propulsion assembly further comprises at least one retractable air intake 40, in addition to the fixed air intakes 30. The retractable air intake(s) 40 are disposed on the top of the fuselage 10 that is to say on an upper face of the fuselage 10. FIG. 4 shows an example in which two retractable air intakes 40 are disposed above the fuselage 10. They are movable between a closed position and an open position. The switching from closed to open position, and vice versa, can be achieved through a mechanical pivot. In the open position, the retractable air intakes 40 have an inlet section 40a representing between 25 and 50% of the inlet section 30a of the fixed air intakes 30. For example, for a fan diameter of 85 inches, corresponding to approximately a diameter of 216 cm, an inlet section 40a of the retractable air intakes 40 in the open position is comprised between 0.8 and 1.2 m$^2$ and the inlet section 30a of the fixed air intakes 30 is comprised between 3 and 3.5 m$^2$. In the closed position, the retractable air intakes 40 have a zero inlet section 40a.

A plenum chamber 50 is disposed in the inner enclosure of the fuselage 10. In this example, the plenum chamber has a parallelepiped shape. This shape is adapted to the general shape of the fuselage 10. However, this shape of the plenum chamber is not limiting and may vary depending on the shape of said fuselage. Particularly, the shape of the plenum chamber can follow generally the shape of the inner wall of the fuselage. For example, if the fuselage has a cylindrical shape, the plenum chamber can itself have a cylindrical shape.

In this embodiment, the plenum chamber 50 has a width 50a extending along the major axis L, a length 50b extending along the longitudinal axis X and a height 50c extending along the minor axis I. Preferably, the width 50a is comprised between 2.1E and 2.8E, the length is comprised between 1.1E and 2.5E, and the height 50c is comprised between 1.3E and 2.0E.

Furthermore, the engines 20 are disposed such that their inlet section 20a is entirely facing the plenum chamber 50, such that the entire surface of the inlet sections 20a communicates with the volume of the plenum chamber 50. For that, a lower end of the inlet sections 20a is disposed above the bottom wall of the plenum chamber 50, and an upper end of the inlet sections 20a is disposed below the upper wall of the plenum chamber 50. In other words, the surface formed by the width 50a and the height 50c is greater than the sum of the inlet sections 20a of the two engines 20 and encompasses both these two inlet sections 20a.

The fixed air intakes 30 are in fluid communication with the plenum chamber 50, such that the air ingested by the fixed air intakes 30 is deflected and directed inwardly of the plenum chamber. Likewise, the retractable air intakes 40 are in fluid communication with the plenum chamber 50 when they are in the open position such that the air ingested by the retractable air intakes 40 is deflected and directed inwardly of the plenum chamber 50. Conversely, when the retractable air intakes 40 are in the closed position, the external air can no longer enter the plenum chamber 50 via the retractable air intakes 40. In other words, in this configuration, only the fixed air intakes 30 allow the ingestion of the external air into the plenum chamber 50. In addition, in this configuration, the wall of the retractable air intakes 40 is located in the continuity of the wall of the fuselage 10, giving it a smooth appearance without relief compared to the reference surface.

FIGS. 7 and 8 show a modified example of the embodiment of the present disclosure, in which the propulsion assembly includes a ramp 12 formed in the wall of the fuselage 10. More specifically, a ramp 12 can be formed upstream of each air intake 30. In a top view of the propulsion assembly, the ramp 12 has the shape of an inclined slope formed and hollowed out in the wall of the fuselage 10, and descending from a portion of said wall located upstream from the air intake 30 up to the inlet section 30*a* of said air intake 30, consequently increasing the inlet section 30*a*.

FIG. 9 shows another modified example of the embodiment of the present disclosure, in which the propulsion assembly includes movable deflectors 60. More specifically, a movable deflector 60 can be provided for each fixed air intake 30. The movable deflectors 60 are movable between a deployed position (illustrated in solid lines in FIG. 9) and a retracted position (illustrated in broken lines in FIG. 9). In the deployed position, the movable deflectors 60 deflect the air entering through the fixed air intakes 30 in the plenum chamber 50 towards the inlet sections 20*a* of the engines 20. In the retracted position, the movable deflectors 60 are folded against an inner wall of the plenum chamber 50 and therefore no longer allow the air to be deflected.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Consequently, the description and the drawings should be considered in an illustrative rather than a restrictive sense.

The invention claimed is:

1. A propulsion assembly for an aircraft, comprising:
   a fuselage extending along a longitudinal axis and enclosing an inner enclosure,
   at least one ducted engine fixed to the fuselage and comprising an air inlet section, the air inlet section being disposed at least partly in the inner enclosure,
   at least one plenum chamber disposed in the inner enclosure upstream of the air inlet section and in fluid communication with said air inlet section, and configured to homogenize and reduce the speed of the flow entering the at least one ducted engine,
   at least one air intake formed on an outer wall of the fuselage, an inlet of the air intake being partly delimited by said outer wall of the fuselage, the at least one air intake being configured to ingest external air and deflect the external air towards the at least one plenum chamber,
   wherein the fuselage has a substantially elliptical section comprising a major axis and a minor axis, the ratio between the major axis and the minor axis being comprised between 1 and 2.5,
   wherein the plenum chamber has a parallelepiped shape comprising a width extending along the major axis, a length extending along the longitudinal axis and a height extending along the minor axis, wherein the width is comprised between 2.1E and 2.8E, the length is comprised between 1.1E and 2.5E and the height is comprised between 1.3E and 2.0E, where E is a diameter of the air inlet section of the at least one ducted engine.

2. The propulsion assembly according to claim 1, wherein the air inlet section of the at least one ducted engine is disposed entirely in the inner enclosure of the fuselage.

3. The propulsion assembly according to claim 1, wherein, in a view perpendicular to the air inlet section of the at least one ducted engine, a surface of the at least one plenum chamber fully includes the surface of the air inlet section.

4. The propulsion assembly according to claim 1, wherein the at least one air intake is a fixed air intake, the propulsion assembly further comprising at least one retractable air intake, configured to be movable between an open position for ingesting the external air via the at least one retractable air intake and directing it towards the at least one plenum chamber and a closed position preventing external air from entering the at least one plenum chamber via the at least one retractable air intake.

5. The propulsion assembly according to claim 4, wherein, at the inlet of the fixed air intake, a maximum spacing between the outer wall of the fuselage and a wall of the fixed air intake delimiting the inlet of said fixed air intake is comprised between 0.5E and 0.8E, where E is the diameter of the air inlet section of the at least one ducted engine.

6. The propulsion assembly according to claim 1, comprising at least one air ingestion ramp hollowed out in the outer wall of the fuselage relative to a reference surface of said wall and extending from a portion of said outer wall located upstream of the at least one air intake up to the inlet section of said air intake.

7. The propulsion assembly according to claim 1, comprising at least one movable deflector disposed in the at least one plenum chamber and configured to switch from a deployed position in which the at least one movable deflector is configured to direct the external air towards the air inlet section of the at least one ducted engine, and a retracted position in which the at least one movable deflector is folded against an inner wall of the at least one plenum chamber.

8. The propulsion assembly according to claim 1, comprising two fixed air intakes formed on the outer wall of the fuselage, at two opposite ends of said fuselage, along a radial direction of said fuselage.

9. The propulsion assembly according to claim 1, wherein at least some inner walls of the plenum chamber comprise an acoustically absorbent material.

10. The propulsion assembly according to claim 1, comprising two engines disposed side by side along a major axis, the at least one plenum chamber being configured to power the two engines.

11. An aircraft comprising the propulsion assembly according to claim 1.

* * * * *